Patented May 23, 1933

1,910,718

UNITED STATES PATENT OFFICE

OTTO HEINRICH STRECKER, OF DARMSTADT, GERMANY

MEDIUM FOR CLEANING AND REDUCING THE SWELLING OF RUBBER, GUTTAPERCHA, AND ARTICLES MADE THEREFROM

No Drawing. Application filed December 18, 1929, Serial No. 415,140, and in Germany December 20, 1928.

The cleaning of rubber and rubber articles with castor oil, alone or with additions or mixed with other liquids is described in, for instance, U. S. Patent No. 1,156,561. And the special application of such a cleaner to the cleaning and contracting of the rubber or guttapercha parts of printing presses is described in British specification No. 246,721. The cleaning medium described in this specification is chiefly intended for washing off printing ink from the rubber or guttapercha sheets of off-set presses, and for reducing the swellings in them caused by the printing ink.

For general use these cleaning media are not very convenient because they dissolve the printing ink only slowly even when applied by vigorous rubbing; and subsequent washing with alcohol is necessary thoroughly to eliminate the residue of the cleaning medium.

These known media can only be made to dissolve the printing ink more expeditiously by adding to them considerable amounts of media in which printing ink is a good deal more quickly soluble than in castor oil. But such additions must not themselves, at least not when mixed with castor oil, cause swelling of the rubber or guttapercha. Hence the usual solvents for printing ink, as benzine, benzol and the like can only be added in insignificant amounts. With ether, it is true, the case is different, but this cannot be added in large quantities on account of the extreme danger of explosion.

The invention makes possible the addition of a substantial quantity of a strong printing ink solvent by employing paraldehyde in addition to castor oil, for instance in the proportion of one to three parts of paraldehyde to one part of castor oil.

Aldehydes, particularly paraldehyde, mixes quite well with castor oil, and gives a very useful cleaning medium. With a cleaner of the composition just mentioned rubber and guttapercha can be easily and quickly washed, and the traces of castor oil adhering to the articles can be thoroughly eliminated by merely wiping with a cloth. The admixture does not prevent the castor oil reducing the swelling of the rubber or guttapercha; nor, if the proportions suggested are observed, does the presence of the paraldehyde give rise to swelling.

Other materials may be added to the castor oil and paraldehyde for particular purposes, such as stretching, as for instance ethyl or methyl alcohol, water, ammonia, benzine, benzol, or ether.

What I claim is:—

1. A medium for cleaning and reducing the swelling of rubber, guttapercha, and articles of rubber and guttapercha consisting principally of a mixture of castor oil and paraldehyde in approximately equal proportions.

2. A medium for cleaning and reducing the swelling of rubber, guttapercha, and articles of rubber and guttapercha consisting principally of a mixture of castor oil and paraldehyde, the paraldehyde being in excess.

In testimony whereof I affix my signature.

OTTO HEINRICH STRECKER.